Feb. 20, 1940.    H. H. MUIR    2,190,993
GRADING SCREEN
Filed May 13, 1937    3 Sheets-Sheet 1
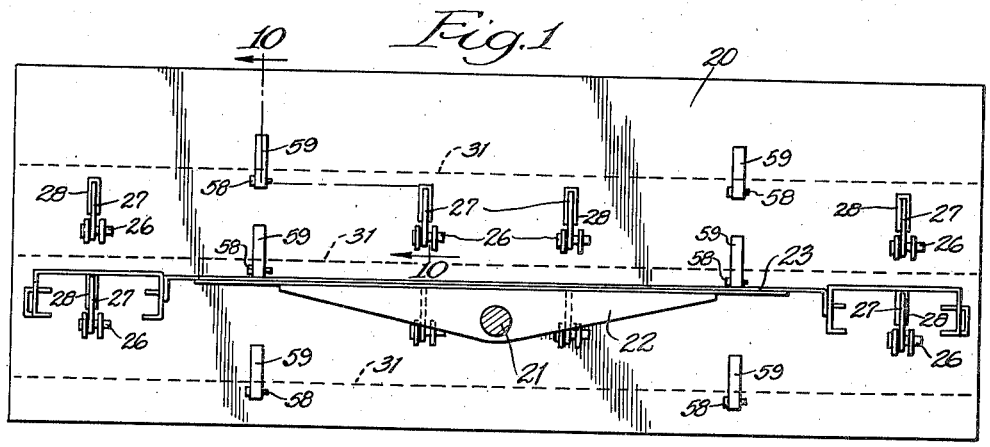
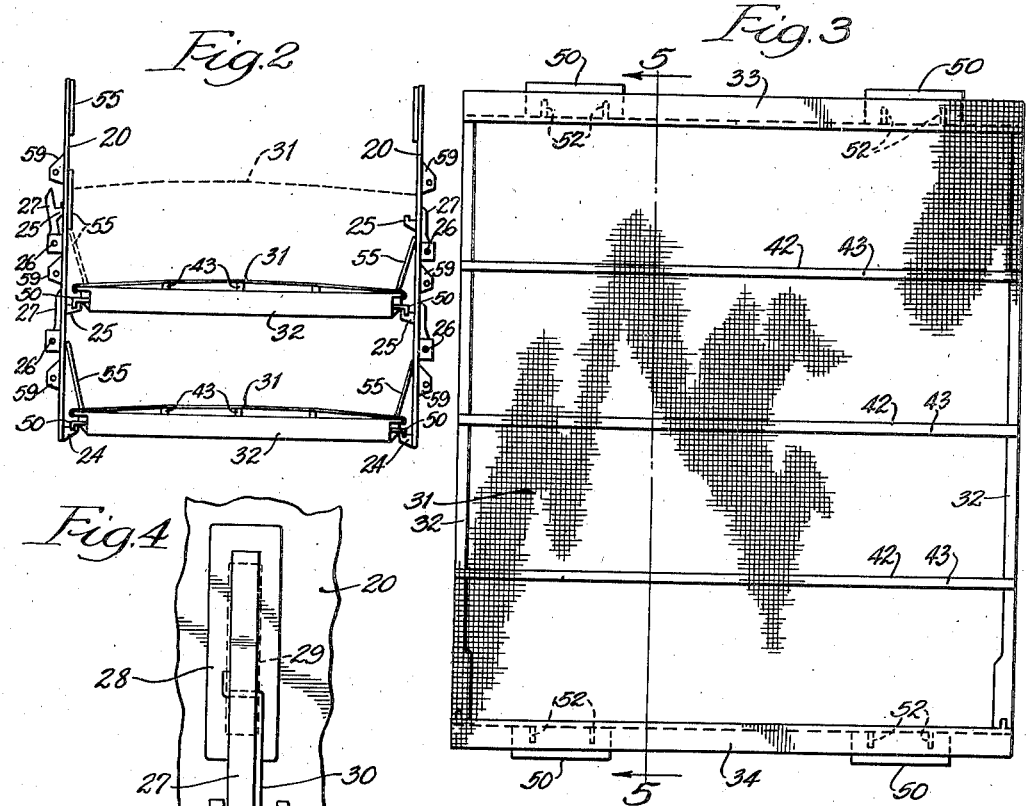
Inventor:
Herbert H. Muir Feb. 20, 1940.                  H. H. MUIR                    2,190,993
                              GRADING SCREEN
                           Filed May 13, 1937           3 Sheets-Sheet 2
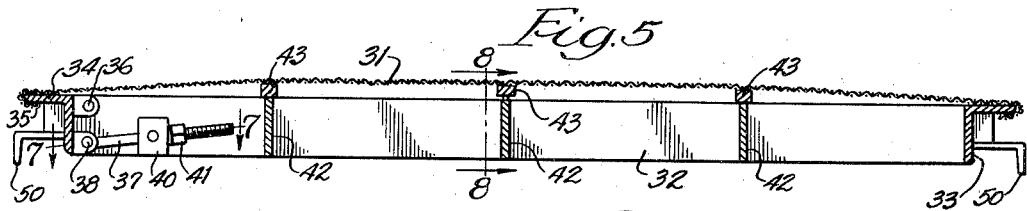
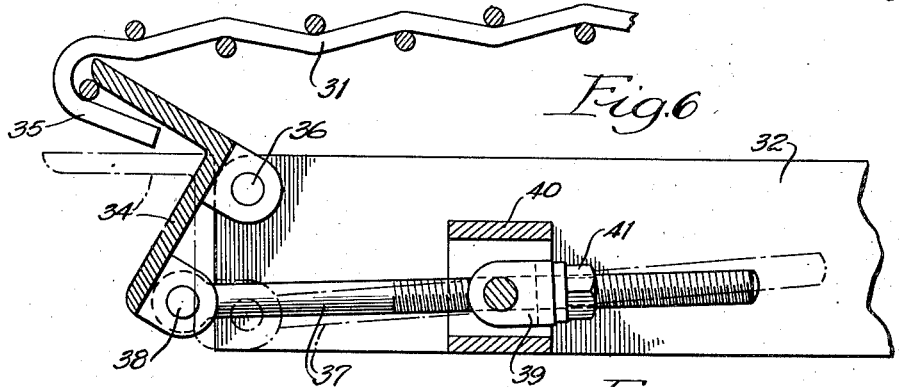
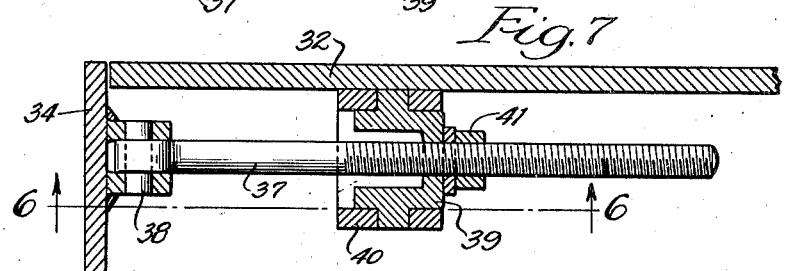
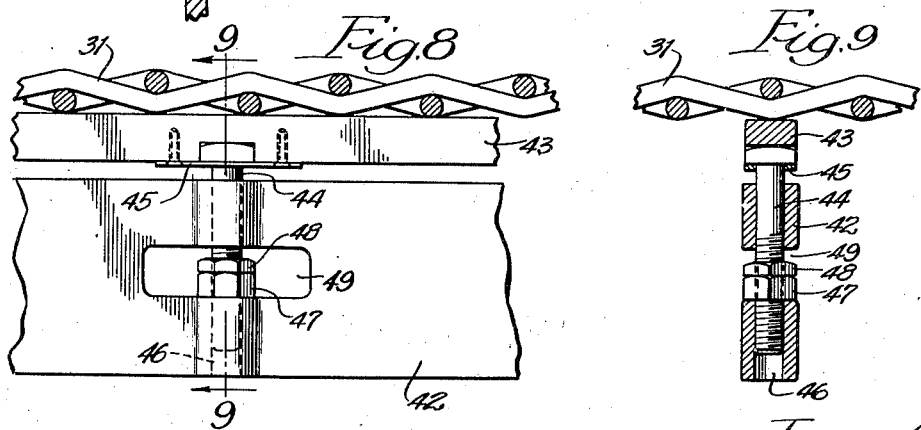
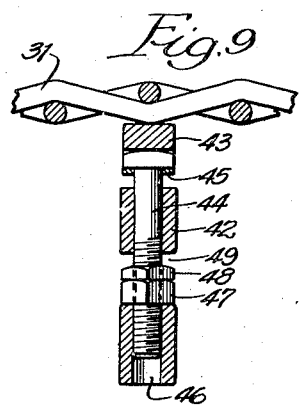
Inventor:
Herbert H. Muir,
Witness:        By Rummler, Rummler & Woodworth,
                                Attorneys.

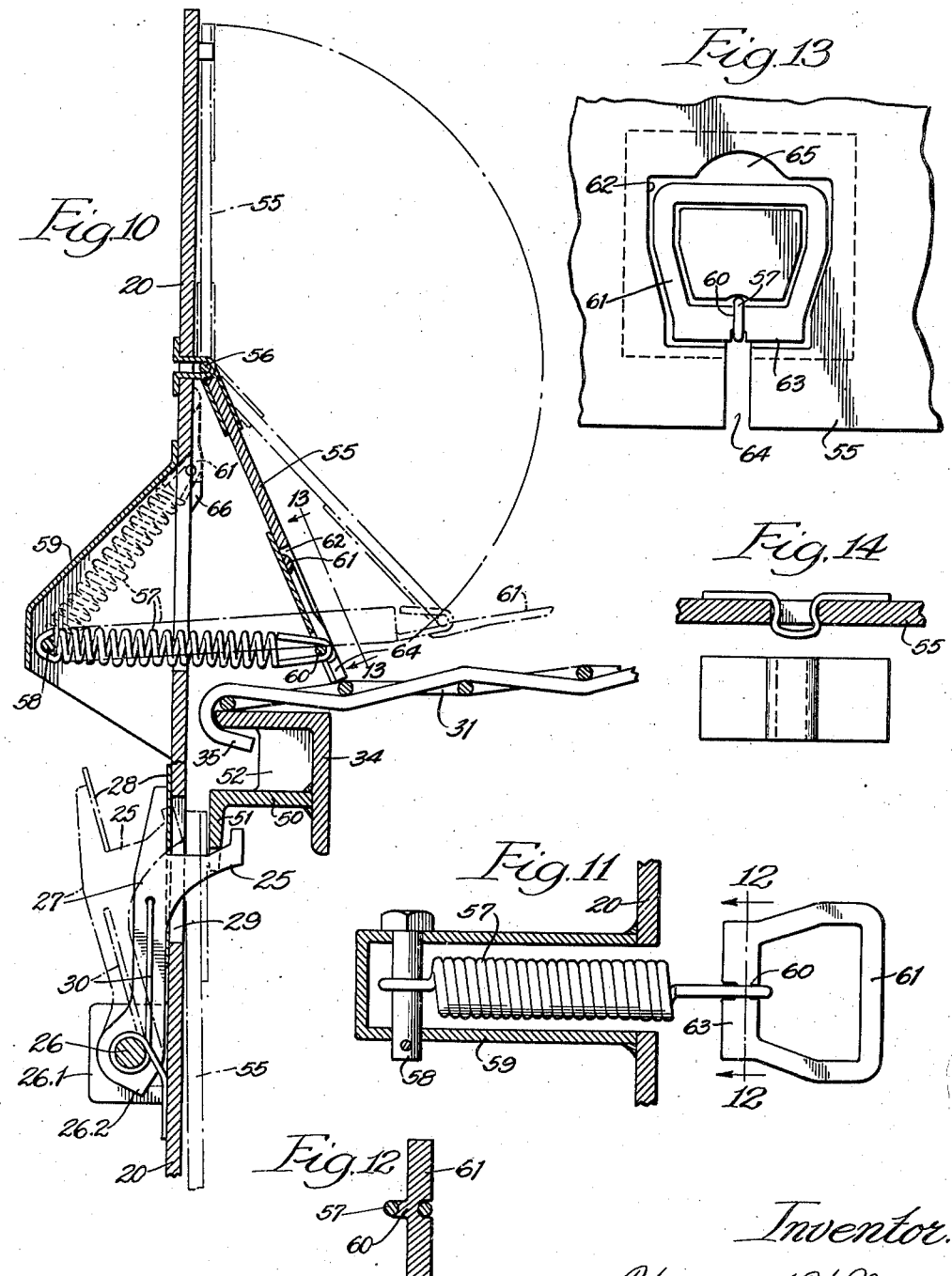

Patented Feb. 20, 1940

2,190,993

UNITED STATES PATENT OFFICE 2,190,993

GRADING SCREEN

Herbert H. Muir, Chicago, Ill.

Application May 13, 1937, Serial No. 142,412

9 Claims. (Cl. 209—319)

This invention relates to screens for grading broken and granular materials such as, for example, crushed coal or rock and has particular reference to structural improvements designed to facilitate the removal, replacement and interchangeability of the screen decks.

The main objects of this invention are to provide improved forms of individual screen frames adapted for ready assembly and replacement of worn screen cloth and for tensioning the screen cloth; to provide improved means for tensioning the screen cloth; to provide improved mounting means for removably, but securely connecting the screen frames to the casing; to provide improved mechanical arrangements for readily retracting the mountings of the upper screens so as to allow of convenient handling of the lower screens; to provide an improved arrangement of apron structures that have the dual function of covering the marginal edges of the lower screens when they are in their operative position, and serving as wall opening closures and coverings for the retracted mountings of the upper screens when the latter have been removed from the casing; and to provide improved screen mounting devices that are retractable and that, without needing to be removed, are secure against loss or rattling in both operative and retracted positions.

A specific embodiment of this invention is illustrated in the accompanying drawings, in which:

Fig. 1 is a side elevation of a multiple deck screen constructed according to this invention.

Fig. 2 is an end elevation of the same, with one screen deck removed.

Fig. 3 is a top plan view of one of the screen panels out of which the screen decks are assembled.

Fig. 4 is an enlarged detail of one of the screen supporting brackets shown in the same outside elevation in which these brackets are indicated in Fig. 1.

Fig. 5 is a section taken on the line 5—5 of Fig. 3.

Fig. 6 is an enlarged fragmentary sectional detail illustrating certain features of the screen cloth tensioning mechanism.

Fig. 7 is another detail of the same mechanism being a section taken on the line 7—7 of Fig. 5.

Fig. 8 is a fragmentary sectional detail taken on the line 8—8 of Fig. 5.

Fig. 9 is a section taken on the line 9—9 of Fig. 8.

Fig. 10 is an enlarged section taken on the offset vertical portions of the line 10—10 of Fig. 1, and illustrates the cooperative relationship of certain features of the screen mounting mechanism.

Fig. 11 is a sectional detail of one of the apron tie members, viewed from above.

Fig. 12 is a section taken on the line 12—12 of Fig. 11.

Fig. 13 is a fragmentary detail illustrating the handle housing socket in the face of the anode as viewed from line 13—13 of Fig. 10.

Fig. 14 is a detail of the snap-button that holds the apron in its elevated position.

In the specific form shown in the drawings, the main supporting frame of the screen comprises spaced uprights preferably in the form of a casing having vertically disposed parallel side walls 20 between which there is mounted a plurality of screen decks in such manner that the whole assemblage is in the form of a chute along which the materials to be screened are caused to flow in the usual manner, so that each deck will deliver a predetermined size of material, the smaller pieces falling through the screens and the grades delivered by the different decks being determined by the mesh of the screen cloth of such deck.

The particular structures and methods for mounting the casing and agitating it are not a part of the present invention and are therefore not illustrated and described herein, except that I have shown in Fig. 1 a portion of the agitator shaft 21, a beam 22, and leaf spring 23 as a diagrammatic representation of some parts of such mechanism.

The number of decks of screens that might be employed on any particular job depends, of course, upon the nature and the degree of grading to which the materials are to be subjected. For the purpose of illustration an arrangement suitable for three decks of screens is shown in Figs. 1 and 2. In Fig. 2 permanent supporting brackets 24 are provided for the lower screen deck and the upper screen decks are carried by retractable brackets having screen supporting arms 25 which extend through apertures in the side walls of the casing. These brackets 25 are pivoted at 26 in clevis-like members 26.1 on the outside of the walls of the casing, as shown in Figs. 4 and 10 and their vertical arms 27 are shaped to form pads 28 that span the apertures 29 through which the bracket arms 25 extend and that serve as limit stops for the arms 25. Light springs 30, shown in Fig. 10, urge the brackets 25 into their load-carrying positions. Lugs 26.2 may be positioned to engage an adjacent abutment as limit stops for the retracting movement of the brackets 25.

The screen decks may be of any appropriate length and each may be made up of one or more segments 31 of convenient handling length mounted end to end to make up a screen of the desired length. Each of the screen segments consists of the usual panel 31 of wire cloth or other meshed fabric and a supporting frame which consists of end bars 32 and side bars 33 and 34. The bars 33 and 34 are preferably angle bars with outwardly facing flanges at the top.

The adjacent margins 35 of the screen decks 31 are bent downwardly so as to hook over and embrace the flanges of the angle bars 33 and 34 as illustrated in Figs. 6 and 10, and the bars 34 are pivotally connected by bolts 36 to the bars 32 so that they may rock in the manner shown in Fig. 6. To this end threaded link bolts 37 are pivoted at 38 to lugs on the angle bar 34 and pass through swiveled abutments 39 carried by brackets 40 on the bars 32. Nuts 41 are mounted on the threaded end portions of the link bolts 37.

By this arrangement the angle bars 34 may be tripped to release the screen panel 31 when the same is to be renewed. When the new screen is placed upon the screen frame an initial tensioning of the screen panel is produced by drawing the angle bars 34 down to their normal place in the plane of the bars 32 by means of the bolts 37 and nuts 41. As will be seen from Figs. 5, 6, and 7, the pivotal axis of the tiltable angle bar 34 is so placed with respect to the adjacent ends of the bars 32 that the ends of said bars serve as positive limit stops against which the tiltable bar bears when drawn down by the link 37 to the position in which it is shown by dotted lines in Fig. 6. Intermediate frame bars 42 extend lengthwise of the panel between the side bars 33 and 34 and these have header strips 43 mounted thereon to support the screen panel, as shown in Figs. 5, 8, and 9. These header strips are carried by bolts 44 whose heads are held stationary in appropriate sockets in the header strips 43 and retained therein by means of plates 45.

The shanks of the bolts 44 loosely engage bores 46 in the bars 42 and are engaged by nuts 47 and lock nuts 48 seated in apertures 49 provided for the purpose.

A further tensioning of the screen panel is provided by means of these header strips which are elevated by their respective bolts and nuts and in order to keep the upper surface of the screen as nearly flat as possible, most of the tensioning is done by means of the outermost header strips 43 as illustrated in Fig. 5, and the medial header strip 43 is then elevated to support the middle of the screen at this position, although it may also be still further raised to apply more tension if desired.

The screen frames are provided with feet 50, four for each screen panel which rest on the supporting brackets 24 and 25. The sectional form of these feet is illustrated in Fig. 10. In the form here shown they are made of short lengths of angle bar welded to the bar 34 so as to provide a depending flange 51 which is notched to engage and partly embrace the bracket 25. The feet 50 are braced by means of webs 52 welded between them and the bar 34 in the manner illustrated in Fig. 10 and Fig. 3.

In order to close the spaces between the margins of the screen panels 31 and the casing walls 20, aprons 55 are hingedly mounted on the side walls of casing 56 above each screen deck, at each side thereof, and these extend downwardly in an inclined direction so as to bear upon the upper surface of the screen deck as shown in Fig. 10. These aprons are drawn into firm contact with the screen so as to hold the feet 50 in firm contact with the brackets 25. This is accomplished by means of extensible tie members, each preferably consisting of a heavy spring 57 secured at one end to a pin 58 in a housing 59 and having linked thereto at 60 at its opposite end a loop-shaped handle 61.

The apron 55 is provided with a socket 62 in which the handle 61 may lie, as shown in Figs. 10 and 13, substantially flush with the inner surface of the apron. The pivot 60 of this handle 61 is positioned eccentrically with respect to the lower fulcrum-like edge 63 of the handle so that the tension of the spring 57 will hold the handle normally in the position in which it is shown in said Figs. 10 and 13. A slot 64 extending from the socket 62 to the lower edge of the apron 55 accommodates the adjacent eye of the spring 57 so as to permit the handle to be seated in or removed from the socket 62. A finger space 65 permits an operator to grasp the handle and turn it out from the face of the apron as shown in dotted lines in Fig. 10 for the purpose of attaching and detaching the spring tension member 57 to and from the apron.

The casing wall 20 has a vertical slot extending upwardly from the tie member 57 wherein, after the apron is released from this tie member and swung to the vertical position in which it is shown in dotted outline in Fig. 10, the tie member 57 may be also swung upwardly to a place where its handle 61 will rest upon ledge lugs 66 and hold the tie member extended in an out of the way position. This position of the tie member is illustrated in dotted lines in Fig. 10.

When the screen supporting brackets 25 are retracted as shown in dotted outline at the lower part of Fig. 10, and the aprons of the screens below are turned up, these aprons hold the brackets in their retracted positions against their limit stop and against the action of their springs 30, the aprons being held in this upturned position by snap fasteners like the one illustrated in Fig. 14, which are suitably positioned on the walls 20 to enter the slot 64 and formed to resiliently engage the sides of said slots.

It will be apparent that when the screen brackets are retracted and the aprons turned up to lie flat against the side walls of the casing all obstruction will be removed and a free path will be afforded for lifting the screens out of the casing. By this arrangement and the provision of separate frames for the screens, it is possible to quickly change the screens when a job requires such change and that the apparatus is therefore particularly adapted for use in places where frequent changes of the screens might be required either by the nature of the job or by the necessity for repair through the avoidance of any necessity for bolting the screens to the casing.

The herein described arrangement of parts assures that all movable parts are snugly held both in their operative and inoperative positions against rattling or becoming lost through the vibration of the screening structure.

The structure and operation of the hereindescribed improvements as distinguished from prior structures may be briefly summarized as follows:

(a) Absence of bolts and nuts and other holding parts requiring detachment.

(b) Substitution for detachable parts of permanently attached spring hand clasps so operating against the skirts or aprons that a jerk on the hand clasp releases the apron and frees the screen cloth frame.

(c) The instantaneous snap clasps into which the skirt may be slammed so as to be held up when changes in the screen are made.

(d) The disappearing supports for the screen cloth frame so arranged that slamming up of the apron, as in (c), blocks out the supports next above, automatically clearing the exit for the removal of the screen cloth frame.

(e) The path for removal and replacement is vertical. This is the most direct and easiest path. A snatch-block or chain-hoist overhead can handle the screen cloth frames. Any arrangement in which endwise insertion of the frames is necessary to clear an obstacle involves hand labor and is arduous, tedious and extremely difficult.

(f) In a sentence, the only part to detach in order to change the screen is the screen. Putting it roughly, a jerk and a slam at both sides of the screen clears the way. There are no small loose parts to fumble, drop and lose. This is of value when at work out of doors in numbing weather, the condition which attends a considerable portion of the country's winter coal screening operations. This changing of screens is to secure a different sizing of product, a requirement which may arise at a moment's notice and occur a number of times daily in the securing of retail coal orders.

(g) Replacement of worn-out screen cloth is of infrequent occurrence, but is advantageously facilitated by the construction illustrated in Figs. 5, 6, and 7 whereby the tilting side bars 34 when in screen supporting position, bear firmly against the ends of the cross bars 32 and whereby the final tensioning of the screen cloth is accomplished by lifting the header strips 43 to produce a slight camber.

Although but one specific embodiment of this invention is herein shown and described, it will be seen that numerous details thereof may be altered or omitted without departing from the spirit of this invention as defined by the following claims:

I claim:

1. A multiple deck screen comprising a casing, a pair of horizontally disposed screens arranged one above another in said casing, supports for the upper screen mounted on said casing and being shiftable laterally outward to clear a path for raising the lower screen, said supports being normally urged into operative position, an apron extending along and overlapping one edge of said lower screen, being hinged to said casing at its upper edge and swingable upwardly against the side wall of said casing, and means coacting with said apron to clamp said lower screen.

2. In a device of the class described, a casing, a screen comprising a meshed fabric, a stretching frame for said fabric, a support on said casing for said stretching frame, and an apron hinging at its upper edge to the wall of said casing and of appropriate width to rest in inclined position so as to bear downward on said screen, and a spring-tension tie member urging said apron outward and normally holding said apron in clamping engagement with said screen, said apron having a vertical slot extending upwardly from its lower edge to receive said tie member and having a seat adjacent said slot, and a handle on said tie member formed to engage said apron at said seat whereby said tie member can be engaged and disengaged from said apron by shifting said handle along said slot.

3. In a device of the class described, upper and lower screens, a vertically disposed casing wall outside said screen and having an aperture therethrough, an upper screen supporting bracket pivotally mounted on the outside of said wall and having an arm extending through said aperture and retractable from said casing through pivotal movement of said bracket, an apron hinged on the inside of the wall of said casing below said bracket for marginal engagement with the lower screen and swingable vertically to close said aperture and hold said bracket retracted.

4. In a device of the class described, a casing having vertically disposed side walls, a horizontally disposed screen extending between said side walls and having a frame independent of said walls, supports on said side walls for said screen frame, an apron extending in an inclined position across the joint between said screen frame and one of said side walls being hinged to the side wall at its upper edge and bearing downward at its lower edge against said screen frame, a mounting on the outside of said casing wall, an extensible tie member comprising a spring for normally shortening the same, being pivoted on said mounting and detachably connected to said apron for normally urging said apron outward and holding the latter in clamping relation to said screen frame, said apron having a vertical slot extending upwardly from its lower edge to receive said tie member and having a seat adjacent said slot, and a handle on said tie member formed to engage said apron at said seat whereby said tie member can be engaged and disengaged from said apron by shifting said handle along said slot.

5. In a device of the class described, a casing having vertically disposed side walls, a horizontally disposed screen extending between said side walls and having a frame independent of said walls, supports on said side walls for said screen frame, an apron extending in an inclined position across the joint between said screen frame and one of said side walls being hinged to the side wall at its upper edge and bearing at its lower edge against said screen frame, a mounting on the outside of said casing wall, an extensible tie member comprising a spring for normally shortening the same, being pivoted on said mounting and detachably connected to said apron for normally holding the latter in clamping relation to said screen frame, said apron having a vertical slot extending upward from its lower edge to receive said tie member and a looped handle on said tie member pivoted thereto and swingable to lie flat against said apron, the pivotal connection being spaced inwardly from the edge of said looped handle whereby the strain on said tie member will maintain said handle in said flat-lying holding position.

6. In a device of the class described a casing having vertically disposed side walls, a horizontally disposed screen extending between said side walls and having a frame independent of said walls, supports on said side walls for said screen frame, an apron extending in an inclined position across the joint between said screen frame and one of said side walls being hinged to the side wall at its upper edge and bearing at its lower edge against said screen frames, a mounting on the outside of said casing wall, an extensible tie member comprising a spring for normally shortening the same, being pivoted on said mounting and detachably connected to said apron for normally holding the latter in clamping relation to said screen frame, said apron having a vertical slot extending upward from its lower edge to receive said tie member and a looped handle on said tie member pivoted thereto and swingable to lie flat against said apron, the pivotal connection being spaced inwardly from the edge of said looped handle whereby the strain on said tie member will maintain said handle in said flat lying holding position, said side wall having a vertical slot through which said tie member may be lifted and said wall having ledge seats for said handle in said lifted position.

7. In a device of the class described, a casing having vertically disposed side walls, a horizontally disposed screen extending between said side walls and having a frame independent of said walls, supports on said side walls for said screen frame, an apron extending in an inclined position across the joint between said screen frame and one of said side walls being hinged to the side wall at its upper edge and bearing at its lower edge against said screen frame, a mounting on the outside of said casing wall, an extensible tie member comprising a spring for normally shortening the same, being pivoted on said mounting and detachably connected to said apron for normally holding the latter in clamping relation to said screen frame, said apron having a vertical slot extending upward from its lower edge to receive said tie member and a looped handle on said tie member pivoted thereto and swingable to lie flat against said apron, the pivotal connection being spaced inwardly from the edge of said looped handle whereby the strain on said tie member will maintain said handle in said flat lying holding position, said apron having a pocket on its inner face adjacent said slot for housing said handle in substantially flush relation to said apron.

8. In a multiple deck screen, a casing having vertical side walls, screen brackets extending horizontally inward from said walls at opposite sides of the casing, a plurality of superposed horizontally disposed screens having rigid frames and resting on said brackets, said brackets being pivoted and having springs normally urging them into their screen supporting positions and being tiltable to a retracted position beyond and clear of the path of the sides of said screens when lifted vertically.

9. In a multiple deck screen a casing having side walls, a pair of screens extending across said casing one above the other, supports on said casing for the upper screen, said supports being shiftable inwardly from the wall of the casing and retractable outwardly beyond the screen edges, an apron hinged to said casing below said upper screen supports and bearing on said lower screen, said apron being also positioned to swing upward to engage said upper screen supports to hold them in their retracted position, and fastening means for said apron when swung upward.

HERBERT H. MUIR.